(12) United States Patent
Kim et al.

(10) Patent No.: US 11,924,550 B2
(45) Date of Patent: Mar. 5, 2024

(54) METHOD FOR PROCESSING IMAGE BY USING ARTIFICIAL NEURAL NETWORK, AND ELECTRONIC DEVICE SUPPORTING SAME

(71) Applicant: Samsung Electronics Co., Ltd., Gyeonggi-do (KR)

(72) Inventors: Seunghun Kim, Gyeonggi-do (KR); Sehyun Lee, Gyeonggi-do (KR); Junghwan Jo, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 413 days.

(21) Appl. No.: 17/286,874

(22) PCT Filed: Oct. 14, 2019

(86) PCT No.: PCT/KR2019/013409
§ 371 (c)(1),
(2) Date: Apr. 20, 2021

(87) PCT Pub. No.: WO2020/091262
PCT Pub. Date: May 7, 2020

(65) Prior Publication Data
US 2021/0385383 A1 Dec. 9, 2021

(30) Foreign Application Priority Data
Oct. 30, 2018 (KR) .................. 10-2018-0130849

(51) Int. Cl.
*H04N 23/68* (2023.01)
*G01P 15/18* (2013.01)
(Continued)

(52) U.S. Cl.
CPC ........... *H04N 23/683* (2023.01); *G01P 15/18* (2013.01); *G06N 3/04* (2013.01); *G06T 5/001* (2013.01);
(Continued)

(58) Field of Classification Search
CPC .. H04N 23/683; H04N 23/6812; H04N 23/80; H04N 23/68; H04N 23/682;
(Continued)

(56) References Cited

U.S. PATENT DOCUMENTS 9,674,441 B2 6/2017 Tsubaki
2012/0301037 A1 11/2012 Vitsnudel et al.
(Continued)

FOREIGN PATENT DOCUMENTS

KR 10-2010-0018128 A 2/2010
KR 10-2011-0133873 A 12/2011
(Continued)

OTHER PUBLICATIONS

Notice of Patent Granted dated Jun. 12, 2023.
(Continued)

*Primary Examiner* — Kelly L Jerabek
(74) *Attorney, Agent, or Firm* — Cha & Reiter, LLC

(57) ABSTRACT

An electronic device according to various embodiments of the present invention, may include a camera, a motion sensor, a memory, and at least one processor, wherein the at least one processor may be configured to, by using the camera, acquire a first image frame, a plurality of second image frames successive to the first image frame, and a third image frame immediately before the first image frame, while the camera acquires the third image frame, the first image frame, and the plurality of the second image frames, detect a movement of the electronic device using the motion sensor, determine a first position of the camera correspond-
(Continued)

ing to the first image frame and a plurality of second positions of the camera corresponding to the plurality of the second image frames respectively, based at least in part on the movement of the electronic device, the first image frame, the plurality of the second image frames, and the third image frame, correct the first position, by conducting computations using a weight learned through an artificial neural network, the first position, the plurality of the second positions, and a post-correction position of a third position of the camera corresponding to the third image frame, and correct the first image frame, based at least in part on the corrected first position.

13 Claims, 10 Drawing Sheets

(51) Int. Cl.
  *G06N 3/04* (2023.01)
  *G06T 5/00* (2006.01)
  *G06T 5/50* (2006.01)
  *H04N 23/80* (2023.01)

(52) U.S. Cl.
  CPC ........... *G06T 5/50* (2013.01); *H04N 23/6812* (2023.01); *H04N 23/80* (2023.01); *G06T 2207/20084* (2013.01); *G06T 2207/20216* (2013.01); *G06T 2207/30244* (2013.01)

(58) Field of Classification Search
  CPC .. H04N 23/681; H04N 23/6811; G06T 5/001; G06T 5/002; G06T 5/003; G06T 5/50; G06T 2207/20216; G06T 2207/30244; G06T 2207/10016; G06T 2207/20081; G06T 2207/20084; G06T 2207/20182; G06T 2207/20201; G06N 3/04; G06N 3/02; G06N 3/08; G06N 3/084; G01P 15/18

See application file for complete search history.

(56) References Cited

U.S. PATENT DOCUMENTS

| | | |
|---|---|---|
| 2013/0156345 A1 | 6/2013 | Shmunk |
| 2016/0353017 A1 | 12/2016 | Kim et al. |
| 2018/0205898 A1 | 7/2018 | Johansson et al. |
| 2020/0077023 A1* | 3/2020 | Kang ................. H04N 23/6812 |
| 2020/0221031 A1 | 7/2020 | Song et al. |
| 2020/0252532 A1 | 8/2020 | Shimokawa et al. |

FOREIGN PATENT DOCUMENTS

| | | |
|---|---|---|
| KR | 10-2013-0102550 A | 9/2013 |
| KR | 10-1528860 B1 | 6/2015 |
| KR | 10-2016-0141572 A | 12/2016 |
| KR | 10-2017-0089992 A | 8/2017 |
| KR | 10-1843990 B1 | 3/2018 |
| KR | 10-2018-0078576 A | 7/2018 |
| KR | 10-2018-0085683 A | 7/2018 |
| KR | 10-2018-0090695 A | 8/2018 |

OTHER PUBLICATIONS

Auto-Directed Video Stabilization with Robust L1 Optimal Camera Paths, 8 pgs.
Deep Online Video Stabilization, 8 pgs.
MeshFlow: Minimum Latency Online Video Stabilization, 16 pgs.
Optical Image Stabilization, 13 pgs.
The Pixel 2 uses "Fused Video Stabilization," and the technology behind it is incredible, 5 pgs.

* cited by examiner

METHOD FOR PROCESSING IMAGE BY USING ARTIFICIAL NEURAL NETWORK, AND ELECTRONIC DEVICE SUPPORTING SAME

CROSS REFERENCE TO RELATED APPLICATIONS

This application is a National Phase Entry of PCT International Application No. PCT/KR2019/013409, which was filed on Oct. 14, 2019, and claims a priority to Korean Patent Application No. 10-2018-0130849, which was filed on Oct. 30, 2018, the contents of which are incorporated herein by reference.

TECHNICAL FIELD

Various embodiments of the present invention relate to an image processing method using an artificial neural network and an electronic device supporting the same.

BACKGROUND ART

In general, while shooting a video image using a camera of an electronic device, a user's hand or body shake may be transmitted to the electronic device.

To correct a camera shake of the electronic device, a hand shake correction function, for example, an optical image stabilizer (OIS) or a digital image stabilizer (DIS) is applied.

DISCLOSURE OF INVENTION

Technical Problem

A hand shake correction function of video of the conventional art uses images acquired before a current image is acquired or images acquired after the current image is acquired, to correct the current image (or image frame). If the current image is corrected using the images acquired before the current image, correction performance may be degraded (or the current image may not be corrected precisely). In addition, if the current image is corrected using the images acquired after acquiring the current image, since the current image is corrected based on a great number of images acquired after acquiring the current image (or the images acquired before the current image store their processing results in a storage device (e.g., a secure digital (SD) card) rather than a system memory, and do not store as images in the system memory but as numerical values, whereas the images acquired afterwards may not store their processing results in the storage device and need to store them on the system memory), memory is used considerably and it may take a lot of time for computations.

Various embodiments of the present invention relate to an image processing method using an artificial neural network and an electronic device supporting the same, for performing hand shake correction on an image using a weight learned through the artificial neural network.

The technical problems to be achieved by the present invention are not limited to the technical problems mentioned above, and other technical problems not mentioned may be clearly understood by those skilled in the art to which the present invention pertains from the following descriptions.

Solution to Problem

An electronic device according to various embodiments of the present invention, may include a camera, a motion sensor, a memory, and at least one processor, wherein the at least one processor may be configured to, by using the camera, acquire a first image frame, a plurality of second image frames successive to the first image frame, and a third image frame immediately before the first image frame, while the camera acquires the third image frame, the first image frame, and the plurality of the second image frames, detect a movement of the electronic device using the motion sensor, determine a first position of the camera corresponding to the first image frame and a plurality of second positions of the camera corresponding to the plurality of the second image frames respectively, based at least in part on the movement of the electronic device, the first image frame, the plurality of the second image frames, and the third image frame, correct the first position, by conducting computations using a weight learned through an artificial neural network, the first position, the plurality of the second positions, and a post-correction position of a third position of the camera corresponding to the third image frame, and correct the first image frame, based at least in part on the corrected first position.

A method According to various embodiments of the present invention, may include, by using a camera of an electronic device, acquiring a first image frame, a plurality of second image frames successive to the first image frame, and a third image frame immediately before the first image frame, while the camera acquires the third image frame, the first image frame, and the plurality of the second image frames, detecting a movement of the electronic device using a motion sensor of the electronic device, determining a first position of the camera corresponding to the first image frame and a plurality of second positions of the camera corresponding to the plurality of the second image frames respectively, based at least in part on the movement of the electronic device, the first image frame, the plurality of the second image frames, and the third image frame, correcting the first position, by conducting computations using a weight learned through an artificial neural network, the first position, the plurality of the second positions, and a post-correction position of a third position of the camera corresponding to the third image frame, and correcting the first image frame, based at least in part on the corrected first position.

Advantageous Effects of Invention

An image processing method using an artificial neural network and an electronic device supporting the same according to various embodiments of the present invention, may perform hand shake correction on an image using a weight learned through the artificial neural network, thus maintaining correction performance, reducing memory usage, and shortening time for process the image through computation reduction.

BEST MODE FOR CARRYING OUT THE INVENTION

Figure 1:
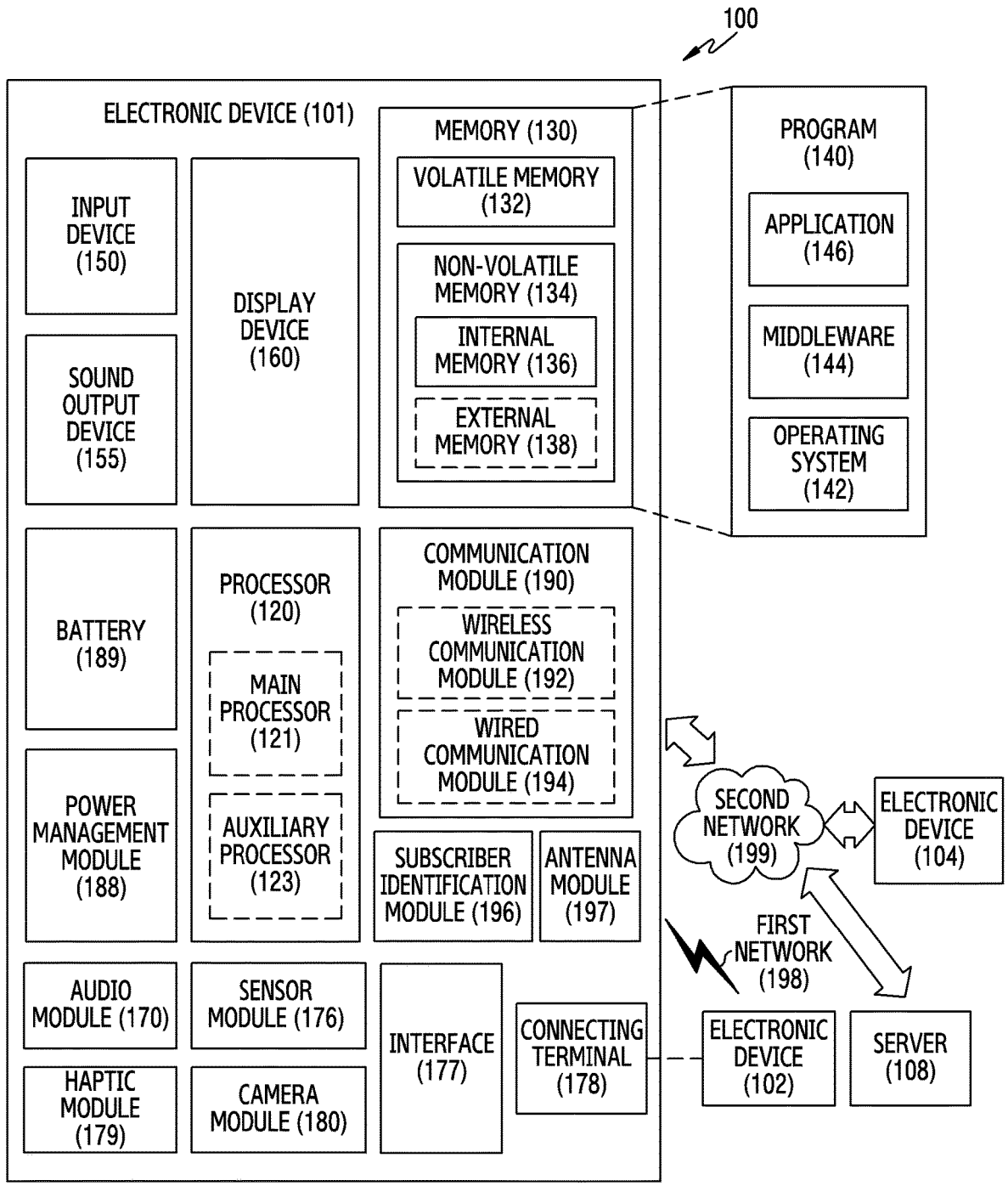
FIG. 1 is a block diagram of an electronic device in a network environment, according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
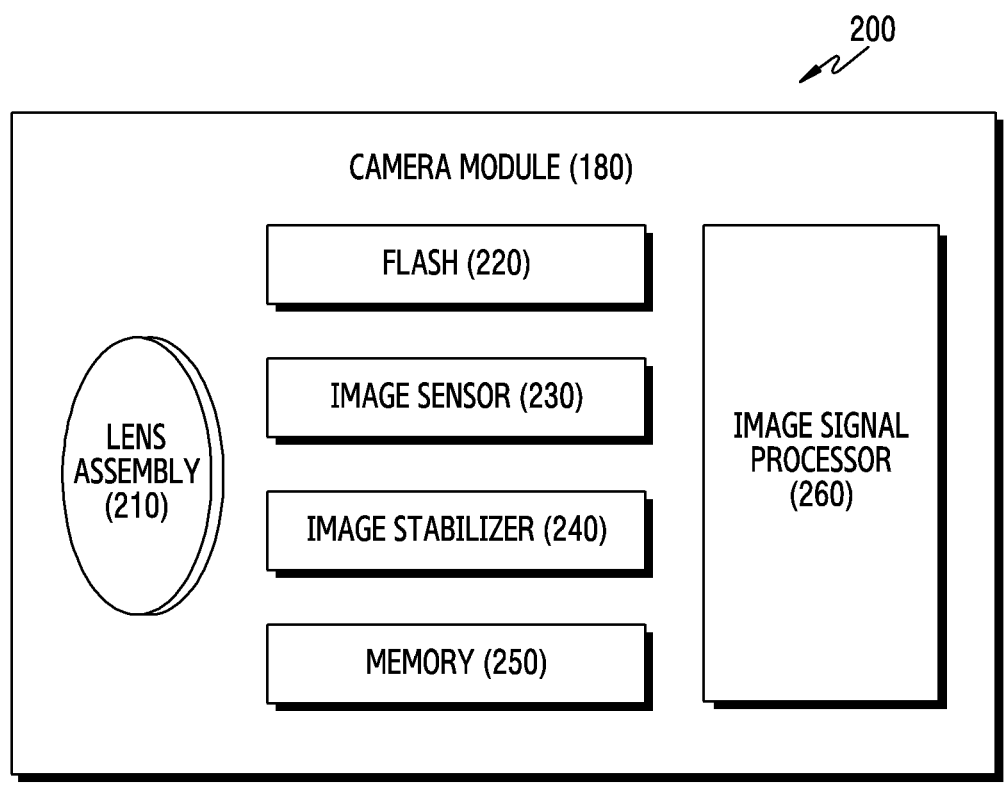
FIG. 2 is a block diagram 200 of a camera module 280, according to various embodiments.

FIG. 2 is a block diagram 200 illustrating the camera module #80 according to various embodiments.

Referring to FIG. 2, the camera module #80 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module #80 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens. The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp.

The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include two or more camera modules 180 having different attributes or functions. In this case, for example, at least one camera module 180 may be a wide-angle camera or a front camera, and at least one other camera module may be a telephoto camera or a rear camera.

Figure 3:
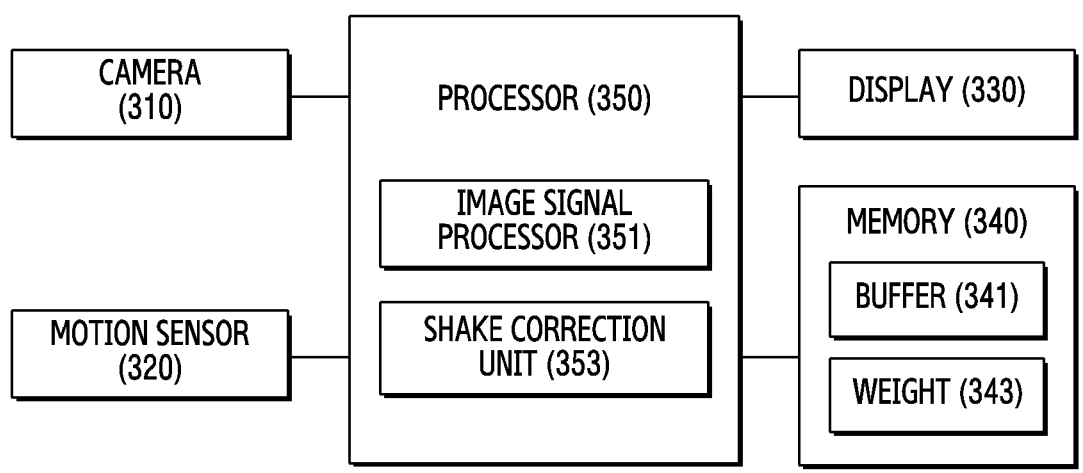
FIG. 3 is a block diagram of an electronic device for processing an image using an artificial neural network, according to various embodiments.

FIG. 3 is a block diagram of an electronic device 101 for processing an image using an artificial neural network, according to various embodiments.

Referring to FIG. 3, in an embodiment, the electronic device 101 may include a camera 310, a motion sensor 320, a display 330, a memory 340, and a processor 350.

In an embodiment, the camera 310 may acquire an image. For example, the camera 310 may acquire a plurality of images successively acquired with respect to a subject.

In an embodiment, the plurality of the images (or original images) successively acquired through the camera 310 may be temporarily stored in a buffer 341 (e.g., the memory 250 of FIG. 2) for next processing.

For example, to perform the hand shake correction function, an image to be corrected (or an image to be currently corrected) (hereafter, referred to as a 'first image frame'), a plurality of successive images of the first image frame required for the correction of the first image frame (or a plurality of images successively acquired after acquiring the first image frame) (hereafter, referred to as 'a plurality of second image frames'), and an image immediately before the first image frame (or an image acquired immediately before acquiring the first image frame) (hereafter, referred to as a 'third image frame') may be stored in the buffer 341.

In an embodiment, the camera 310 may include at least partial configuration of the camera module 180 of FIG. 1 and FIG. 2.

In an embodiment, the motion sensor 320 may detect a movement of the electronic device 101 while acquiring an image using the camera 310. For example, while acquiring the third image frame, the first image frame, and the plurality of the second image frames using the camera 310, the motion sensor 320 may detect the movement of the electronic device 101.

In an embodiment, the motion sensor 320 may include a gyro sensor (or a gyroscope) for detecting the movement of the electronic device 101. However, it is not limited thereto, and in an embodiment, the motion sensor 320 may include an acceleration sensor for detecting the movement of the electronic device 101.

In an embodiment, the motion sensor 320 may transmit information of the detected movement of the electronic device 101 to the processor 350.

In an embodiment, the motion sensor 320 may be included in the sensor module 176 of FIG. 1.

In an embodiment, the display 330 may output a plurality of images in which the plurality of the images acquired through the camera 310 is corrected (or corrected by executing the hand shake correction function).

In an embodiment, the display 330 may be included in the display device 160 of FIG. 1.

In an embodiment, the memory 340 may store various information related to image processing.

In an embodiment, the memory 340 may include the buffer 341 and a weight 343.

In an embodiment, the buffer 341 may temporarily store a plurality of images acquired using the camera. In an embodiment, the buffer 341 may be identical or similar to at least part of the memory 340 and 250 of FIG. 2.

In an embodiment, the buffer 341 may store the first image frame, the plurality of the second image frames, and the third image frame, to correct the first image frame (or in correcting the first image frame).

In an embodiment, if the correction for the first image frame (e.g., an n-th image frame) is performed (or after the first image frame is corrected), to correct a next image frame (e.g., an n+1-th image frame) of the first image frame, the buffer 341 may store an image frame immediately after the first image frame, a plurality of image frames successive to the image frame immediately after the first image frame, and the first image frame.

Yet, the information stored in the buffer 341 is not limited to the above-described example.

In an embodiment, the weight may be a weight learned through the artificial neural network. In an embodiment, the weight may be used to generate output data for determining a corrected camera position through computation with input data. In an embodiment, if the weight is learned at other electronic device (e.g., the electronic devices 102 and 104 or the server 108), it may be received from the other electronic device 101. A method for learning the weight through the artificial neural network and a method for generating output data through computation with input data shall be described later in detail.

In an embodiment, the processor 350 may perform an overall operation for processing an image.

In an embodiment, the processor 350 may include an image signal processor 351 and a shake correction unit 353.

In an embodiment, the image signal processor 351 may perform at least part of a correction operation on a plurality of images acquired using the camera 310. For example, the image signal processor 351 may crop an image to store or to output from the plurality of the images (or a plurality of raw images) acquired using the camera 310.

In an embodiment, the image signal processor 351 may be at least in part identical or similar to the image signal processor 260 of FIG. 2.

In an embodiment, the shake correction unit 353 may perform the correction operation on the plurality of the images acquired through the camera 310.

Hereinafter, as part of a method of the shake correction unit 353 for correcting a plurality of images acquired through the camera 310, a method of the shake correction unit 353 for correcting the first image frame is explained first.

In an embodiment, to correct the first image frame, the shake correction unit 353 may acquire (or receive) the third image frame, the first image frame, and the plurality of the second image frames from the camera 310.

In an embodiment, the shake correction unit 353 may detect a movement of the electronic device 101 using the motion sensor 320, while the camera 310 acquires the third image frame, the first image frame, and the plurality of the second image frames.

In an embodiment, based at least in part on information related to the movement of the electronic device 101, the third image frame, the first image frame, and the plurality of the second image frames, the shake correction unit 353 may determine camera positions (or displacements, or coordinates) corresponding to the third image frame, the first image frame, and the plurality of the second image frames respectively.

In an embodiment, the camera position may correspond to an image change (or a movement) (or a change degree) between image frames by the movement of the electronic device 101. For example, a difference between the camera position corresponding to the third image frame and the camera position corresponding to the first image frame may correspond to a pixel difference (or the number of pixels) between pixels representing the subject in the third image frame and pixels representing the subject in the first image frame, with respect to the same subject (or a fixed subject). As another example, the camera position corresponding to the first image frame may be the camera position (or displacement) at the first image frame acquisition, relative to the camera position (or the camera position of initially acquiring the image frame) corresponding to an image frame initially acquired (hereafter, referred to as the "initial image frame") (or based on the camera position corresponding to the initial image frame), by an input for image acquisition.

In an embodiment, the camera position may be referred to as a camera path, a camera trajectory, or a motion vector (or a global motion vector) of image frames.

Hereinafter, the camera position before the hand shake correction is referred to as a 'pre-correction camera position', and the camera position after the hand shake correction is referred to as a 'post-correction camera position'.

In an embodiment, the shake correction unit 353 may correct an error of the image change (or the pixel difference) between the third image frame and the first image frame based on the movement (or the movement degree) of the electronic device 101 detected through the motion sensor 320 while the camera 310 acquires the third image frame and the first image frame. The shake correction unit 353 may remove noise of the movement of the electronic device 101 based on the image change between the third image frame and the first image frame with the error corrected, and thus determine the camera position (or the pre-correction camera position) corresponding to the first image frame. Pre-correction camera positions corresponding to the plurality of the second image frames respectively may be determined in the same manner as the method of determining the pre-correction camera position corresponding to the first image frame. A pre-correction camera position corresponding to the third image frame may be determined through an operation of correcting the third image frame before correcting the first image frame and then stored in the memory 340.

In an embodiment, the shake correction unit 353 may determine (or calculate) a post-correction camera position corresponding to the first image frame (or a difference between post-correction camera position corresponding to the third image frame and the post-correction camera position corresponding to the first image frame), by performing computations using the weight 343 learned through the artificial neural network, the pre-correction camera position corresponding to the first image frame (or the pre-correction camera position corresponding to the first image frame and a correctable position of the pre-correction camera position corresponding to the first image frame), the pre-correction camera positions corresponding to the plurality of the second image frames respectively (or the pre-correction camera positions corresponding to the plurality of the second image frames and correctable positions of the pre-correction camera positions corresponding to the plurality of the second image frames), and the post-correction camera position corresponding to the third image frame.

In an embodiment, the shake correction unit 353 may determine a post-correction camera position corresponding to the first image frame, by performing computations using the weight 343 learned through the artificial neural network, the pre-correction camera position corresponding to the first image frame, the pre-correction camera positions corresponding to the plurality of the second image frames respectively, the post-correction camera position corresponding to the third image frame, and a difference between the post-correction camera position corresponding to the third image frame and a correctable position (or range) of the post-correction camera position corresponding to the third image frame.

In an embodiment, the shake correction unit 353 may determine a post-correction camera position corresponding to the first image frame, by performing computations using the weight 343 learned through the artificial neural network, the pre-correction camera position corresponding to the first image frame, the pre-correction camera positions corresponding to the plurality of the second image frames respectively, the post-correction camera position corresponding to the third image frame, and an average of the post-correction camera positions corresponding to a designated number of image frames before the third image frame (or acquired before acquiring the third image frame).

In an embodiment, the shake correction unit 353 may determine a post-correction camera position corresponding to the first image frame, by performing computations using the weight 343 learned through the artificial neural network, the pre-correction camera position corresponding to the first image frame, the pre-correction camera positions corresponding to the plurality of the second image frames respectively, the post-correction camera position corresponding to the third image frame, the difference between the post-correction camera position corresponding to the third image frame and the correctable position of the pre-correction camera position corresponding to the third image frame, and an average of camera positions corresponding to a designated number of image frames before the third image frame.

In an embodiment, the shake correction unit 353 may determine an image area (or portion) to be stored or outputted from the first image frame, based at least in part on the post-correction camera position corresponding to the first image frame. For example, the shake correction unit 353 may determine the image area to be stored or outputted from the first image frame, based at least in part on the pre-correction camera position corresponding to the first image frame and the post-correction camera position corresponding to the first image frame.

In an embodiment, after determining the image area to be stored or outputted from the first image frame (or after correcting the first image frame), the shake correction unit 353 may correct a next image frame of the first image frame (or an image frame acquired immediately after acquiring the first image frame). Since the operation of correcting the next image frame of the first image frame is identical at least in part to the operation of correcting the first image frame aforementioned, its detailed descriptions will be omitted.

In an embodiment, the processor 350 may be identical or similar at least in part to the processor 350 of FIG. 1.

Figure 4:
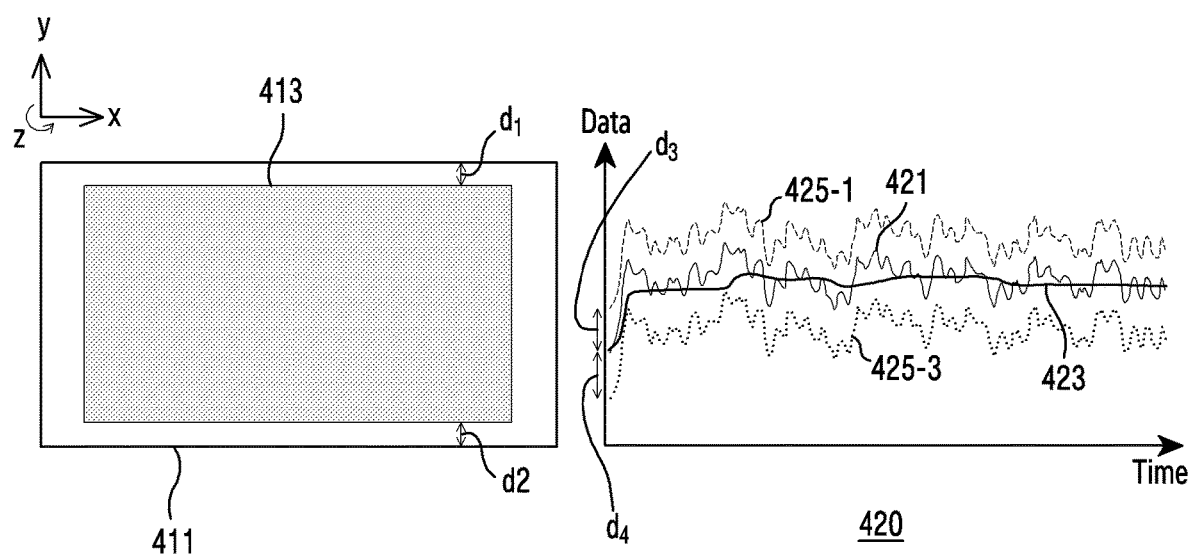
FIG. 4 is a diagram for illustrating a method for correcting a camera position using a hand shake correction algorithm, according to various embodiments.

FIG. 4 is a diagram for illustrating a method for correcting a camera position using a hand shake correction algorithm, according to various embodiments.

Referring to FIG. 4, in an embodiment, an image frame 411 may represent an initial image frame (or an original initial image frame), and an image area 413 may represent an image area to be stored or outputted within the initial image frame. In an embodiment, the x axis may be related to left and right movements of the image area 413 in the image frame 411, the y axis may be related to vertical movements of the image area 413 in the image frame 411, and the z axis may be related to clockwise or counterclockwise rotations (or rotation amount) of the image area 413 in the image frame 411.

In a graph 420 of FIG. 4, in an embodiment, a line 421 may indicate pre-correction camera positions (or displacements) (or a trajectory of the positions) corresponding to image frames successively acquired using the camera with respect to the y axis, and a line 423 may indicate post-correction camera positions corresponding to image frames successively acquired using the camera with respect to the y axis. In an embodiment, lines 425-1 and 425-3 may indicate correctable positions (or correctable ranges, or margins) of the pre-correction camera positions corresponding to the image frames with respect to the y axis. For example, in an image frame, if the post-correction camera position corresponding to the image frame is greater than or equal to coordinates of the line 425-1 or less than or equal to coordinates of the line 425-3, some of the image area to be stored or displayed (or an area to be cropped) may not be included in the area of the image frame (or the original image frame) (or some of the image area to be stored or displayed may not be displayed).

In an embodiment, the lines 425-1 and 425-3 may be determined by a size of the image frame 411 and a size of the image area 413 (or a difference between the size of the frame 411 and the size of the image area 413). For example, the size difference (d1+d2) between the image frame 411 and the image area 413 on the y axis may be identical to a sum of a difference between the coordinates of the line 425-1 and the coordinates of the line 421 and a difference between the coordinates of the line 421 and the coordinates of the line 425-3 at t=0 in the graph 420. In an embodiment, d1 and d2 may be equal, and d3 and d4 may be equal.

The graph 420 of FIG. 4 illustrates the lines related to the camera position with respect to the y axis, but may be applied to the lines related to the camera position with respect to the x axis and z axis respectively in the same or similar manner.

Hereafter, in FIG. 5, a method for determining a line 423 using a hand shake correction algorithm (or a method for determining post-correction camera positions corresponding to image frames successively acquired using a camera) will be described in detail.

Figure 5:
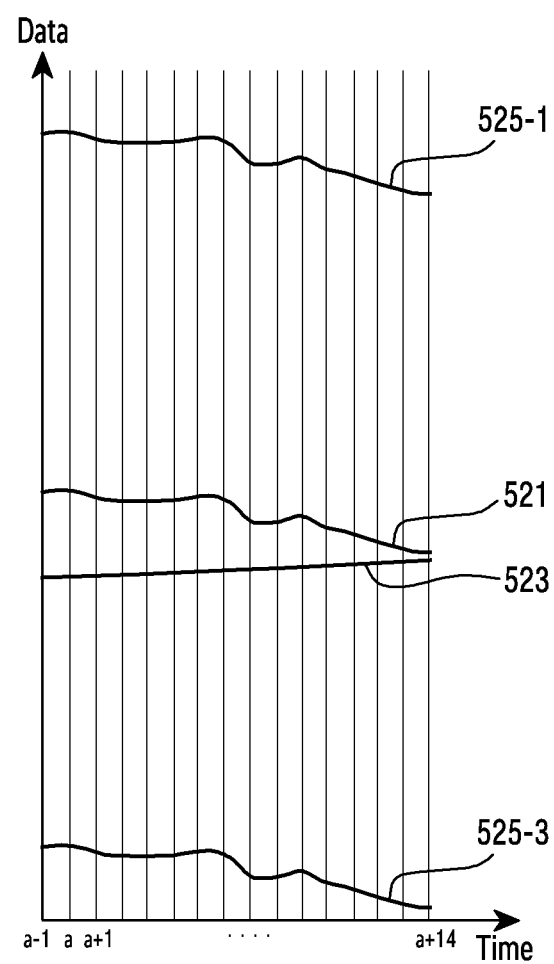
FIG. 5 is a diagram for illustrating a method for determining a position after camera correction corresponding to a first image frame, using a hand shake correction algorithm, according to various embodiments.

FIG. 5 is a diagram for illustrating a method of determining a post-correction camera position corresponding to a first image frame, using a hand shake correction algorithm, according to various embodiments.

Referring to FIG. 5, in an embodiment, the electronic device 101 may identify pre-correction camera positions corresponding to a first image frame (e.g., an image frame acquired at time t=a) through a plurality of second image frames (e.g., a plurality of image frames acquired at time t=a+1 through t=a+5) and a post-correction camera position corresponding to a third image frame (an image frame acquired at time t=a−1). In an embodiment, lines 521, 523, 525-1, and 525-3 shown in FIG. 5 may be lines on the x axis.

In an embodiment, the electronic device 101 may determine post-correction camera positions which satisfy a designated condition. Hereafter, to distinguish from corrected camera positions (e.g., the line 423) with respect to the image frames shown in FIG. 4, the post-correction camera positions (e.g., the line 523) corresponding to the third image frame, the first image frame, and the plurality of the second image frames to be determined to correct the pre-correction camera position corresponding to the first image frame is referred to as 'virtual post-correction camera positions'

In an embodiment, the electronic device 101 may determine the virtual post-correction camera positions (e.g., the line 523) disposed between the line 525-1 and the line 525-3 indicating the correctable range of the post-correction camera positions corresponding to the first image frame through the plurality of the second image frames respectively, and satisfying a condition which minimizes a sum value of changes (or absolute values of changes) between a virtual post-correction camera position corresponding to the third image frame through virtual post-correction camera positions (or virtual post-correction camera positions corresponding to image frames acquired at t=a−1 through t=a+14)

corresponding to the last image frame (e.g., an image frame acquired at t=a+15) of the plurality of the image frames, a sum value of speed changes of the virtual post-correction camera positions, a sum value of acceleration changes of the virtual post-correction camera positions, changes of the virtual post-correction camera positions, or at least two sum values considering a weight of the change, the speed change, or the acceleration change of the virtual post-correction camera positions.

For example, in FIG. 5, the electronic device 101 may determine the line 523 lying between the line 525-1 and the line 525-3 including the virtual post-correction camera positions corresponding to the image frames acquired at t=a through t=a+14, and satisfying the following [Equation 1] or [Equation 2] as the virtual post-correction camera positions.

$$\sum_{k=a}^{a+14} W1 \times |P(k) - P(k-1)| + \qquad \text{[Equation 1]}$$
$$W2 \times |V(k) - V(k-1)| + W3 \times |A(k) - A(k-1)|$$

$$\sum_{k=a}^{a+14} W1 \times (P(k) - P(k-1))^2 + \qquad \text{[Equation 2]}$$
$$W2 \times (V(k) - V(k-1))^2 + W3 \times (A(k) - A(k-1))^2$$

In an embodiment, in [Equation 1] and [Equation 2], P(k) may denote a virtual post-correction camera position corresponding to the image frame acquired at time t=k, V(k) may denote a speed after the virtual camera correction corresponding to the image frame acquired at t=k, and A(k) may denote an acceleration after the virtual camera correction corresponding to the image frame acquired at t=k. In addition, W1, W2, and W3 may denote changeable weights (or weight parameters).

In an embodiment, V(k) and A(k) may be defined by the following [Equation 3] and [Equation 4] respectively.

$$V(K)=P(k)-P(k-1) \qquad \text{[Equation 3]}$$

$$A(k)=V(k)-V(k-1) \qquad \text{[Equation 4]}$$

In an embodiment, the electronic device 101 may exclude the condition that the virtual post-correction camera positions corresponding to the first image frame through the plurality of the second image frames respectively are within correctable positions, and determine the virtual post-correction camera positions based on the condition which minimizes the sum value of the changes (or the absolute values of changes) between the virtual post-correction camera position corresponding to the last image frame of the virtual post-correction camera position corresponding to the third image frame through the plurality of the image frames, the sum value of the speed changes of the virtual post-correction camera positions, the sum value of the acceleration changes of the virtual post-correction camera positions, the changes of the virtual post-correction camera positions, or at least two sum values considering the weight of the change, the speed change, or the acceleration change of the post-correction camera positions.

FIG. 5 and [Equation 1] and [Equation 2] illustrate the case in which the number of the first image frame through the plurality of the second image frames is 15, but is not limited thereto.

In an embodiment, the electronic device 101 may determine the virtual correction camera position corresponding to the first image frame among the virtual post-correction camera positions satisfying the designated condition, to the post-correction camera position corresponding to the first image frame.

In the above examples, based on the pre-correction camera positions corresponding to the first image frame through the plurality of the second image frames and the post-correction camera position corresponding to the third image frame, the method for determining the post-correction camera position corresponding to the first image frame is illustrated, but is not limited thereto. For example, the electronic device 101 may determine the post-correction camera position corresponding to the first image frame, by further considering a difference between the post-correction camera position corresponding to the third image frame and the correctable position of the pre-correction camera position corresponding to the third image frame, together with the pre-correction camera positions corresponding to the first image frame through the plurality of the second image frames and the post-correction camera positions corresponding to the third image frame.

FIG. 5 illustrates the method for determining the post-correction camera position corresponding to the first image frame with respect to the x axis, but the method for determining the post-correction camera position corresponding to the first image frame may be applied to the y axis and the z axis in the same manner.

FIG. 5 illustrates the method for determining the post-correction camera position corresponding to the first image frame, but it may be applied to a method for determining post-correction camera positions corresponding to next image frames of the first image frame respectively in the same or similar manner.

The hand shake correction algorithm described in FIG. 5 is an example, and is not limited thereto. For example, as the hand shake correction algorithm, a kalman filter, a particle filter, or a low path filter may be used.

FIG. 5 illustrates that it is conducted at the electronic device 101, but it is not limited thereto. For example, the operations of FIG. 5 may be performed at other electronic device (e.g., the electronic devices 102 and 104 or the server 108).

Figure 6:
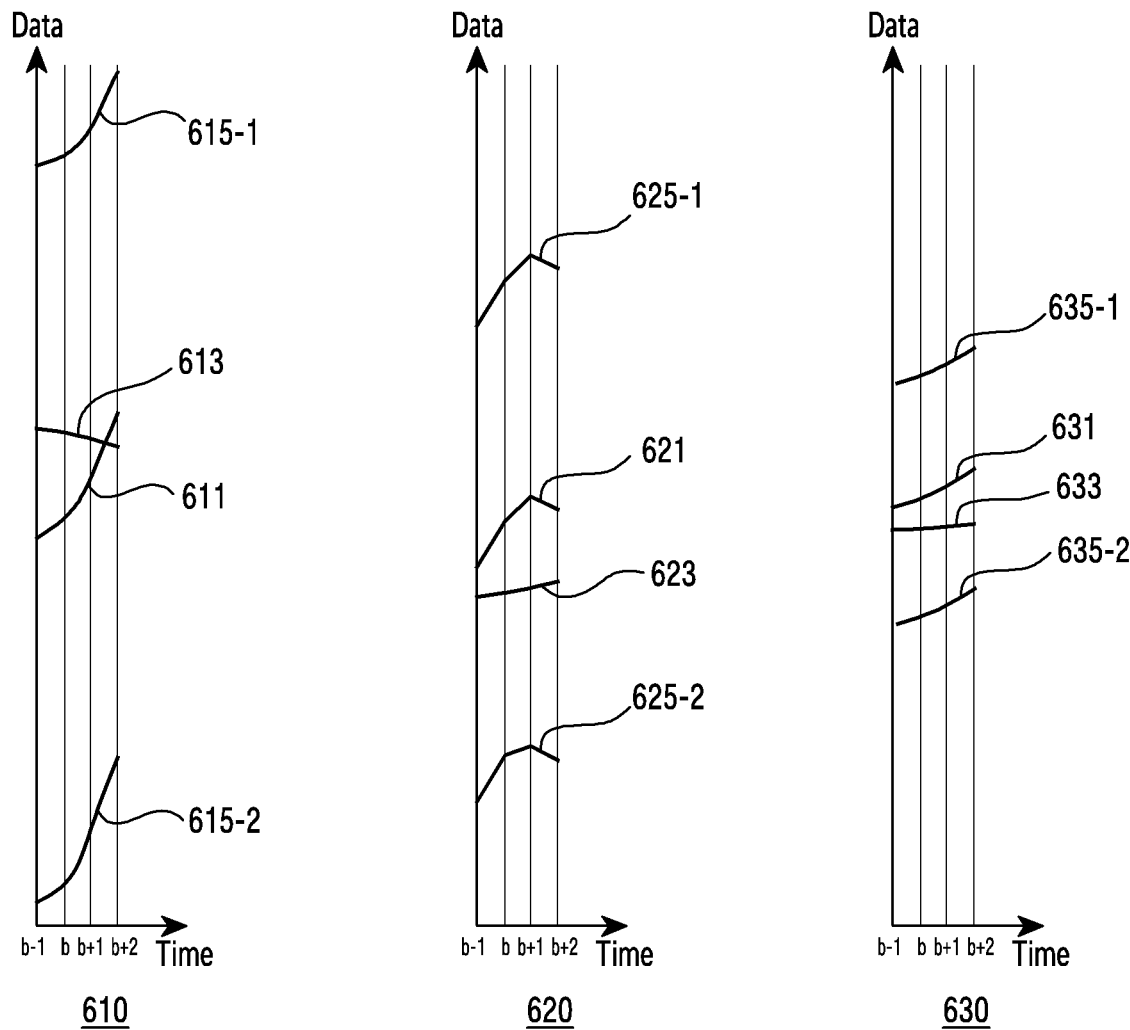
FIG. 6 is a diagram for illustrating a method of determining a weight through an artificial neural network, according to various embodiments.

FIG. 6 is a diagram for illustrating a method of determining the weight 343 through an artificial neural network, according to various embodiments.

Referring to FIG. 6, in an embodiment, the electronic device 101 may determine the weight 343, using the information acquired (or determined) through the operations of FIG. 5.

In an embodiment, the electronic device 101 may identify, as input data for the learning, the pre-correction camera position corresponding to the first image frame determined through the operations of FIG. 5, the pre-correction camera positions corresponding to the plurality of the second image frames (or the pre-correction camera positions corresponding to the plurality of the second image frames respectively and the correctable positions of the pre-correction camera positions corresponding to the plurality of the second image frames), and the post-correction camera position corresponding to the third image frame. However, the input data for the learning is not limited to the above-described examples. For example, the input data may include the pre-correction camera position corresponding to the first image frame, the pre-correction camera positions corresponding to the plurality of the second image frames, the post-correction camera position corresponding to the third image frame, and a difference between the post-correction camera position corresponding to the third image frame and the correctable position (or range) of the post-correction camera position corresponding to the third image frame. As another example, the input data may include the pre-correction camera position corresponding to the first image frame, the pre-correction camera positions corresponding to the plurality of the second image frames, the post-correction camera position corresponding to the third image frame, and an average of the post-correction camera positions corresponding to a designated number of image frames before the third image frame (or acquired before acquiring the third image frame).

In an embodiment, the post-correction camera positions determined through the hand shake correction algorithm of FIG. 5 may be used for error correction of the weight (or the post-correction camera positions determined through the hand shake correction algorithm may be used as ground truth). For example, if the post-correction camera position corresponding to the first image frame (or the difference between the post-correction camera position corresponding to the third image frame and the post-correction camera position corresponding to the first image frame) is determined (or generated) through the computation between the input data and the weight, the weight may be learned (or updated, or retraining) (e.g., learning using error back propagation) based on an error between the post-correction camera position corresponding to the first image through the computation between the determined input data and the weight and the post-correction camera position corresponding to the first image frame determined through the hand shake correction algorithm.

In an embodiment, the number of the pre-correction camera positions corresponding to the first image frame through the second image frames for the learning through the artificial neural network may be less than the number of the pre-correction camera positions corresponding to the first image frame through the second image frames used in the hand shake correction algorithm of FIG. 5.

In an embodiment, the number of the pre-correction camera positions corresponding to the first image frame through the second image frames used in the hand shake correction algorithm may be about 15 through 30. The number of the pre-correction camera positions corresponding to the first image frame through the second image frames for the learning through the artificial neural network may be about 3 through 6.

For example, as shown in FIG. 6, with respect to the x axis, the y axis, and the z axis, the number of the pre-correction camera positions corresponding to the first image frame through the second image frames for the learning through the artificial neural network may be four.

In an embodiment, as shown in a graph 610 of FIG. 6, with respect to the x axis, pre-correction camera positions (e.g., a line 611) and post-correction camera positions (e.g., a line 613) corresponding to the third image frame (e.g., an image frame obtained at time t=b−1), the first image frame (e.g., an image frame acquired at time t=b) and two second image frames (e.g., image frames acquired at times t=b+1 and t=b+2), and correctable positions (e.g., lines 615-1, 615-2) of the pre-correction camera positions corresponding to the image frames respectively may be used for the learning.

In an embodiment, as shown in a graph 620 of FIG. 6, with respect to the y axis, pre-correction camera positions (e.g., a line 621) and post-correction camera positions (e.g., a line 623) corresponding to the third image frame (e.g., the image frame acquired at the time t=b−1), the first image frame (e.g., the image frame acquired at the time t=b) and the two second image frames (e.g., the image frames acquired at the times t=b+1 and t=b+2), and correctable positions (e.g., lines 625-1, 625-2) of the pre-correction camera positions corresponding to the image frames respectively may be used for the learning.

In an embodiment, as shown in a graph 630 of FIG. 6, with respect to the z axis, pre-correction camera positions (e.g., a line 631) and post-correction camera positions (e.g., a line 633) corresponding to the third image frame (e.g., the image frame acquired at the time t=b−1), the first image frame (e.g., the image frame acquired at the time t=b) and the two second image frames (e.g., the image frames acquired at the times t=b+1 and t=b+2), and correctable positions (e.g., lines 635-1, 635-2) of the pre-correction camera positions corresponding to the image frames respectively may be used for the learning.

In an embodiment, the artificial neural network may include convolutional neural networks (CNN), recurrent neural networks (RNN), or deep belief networks, and restricted boltzman machines. However, it is not limited thereto, and artificial neural networks of various types may be used.

In an embodiment, the operations of FIG. 6 may be carried out at other electronic device (e.g., the electronic devices 102 and 104 or the server 108).

In an embodiment, if the operations of FIG. 6 are conducted at other electronic device (e.g., the electronic devices 102 and 104 or the server 108), the weight determined through the operations of FIG. 6 may be transmitted to the electronic device 101.

Figure 7:
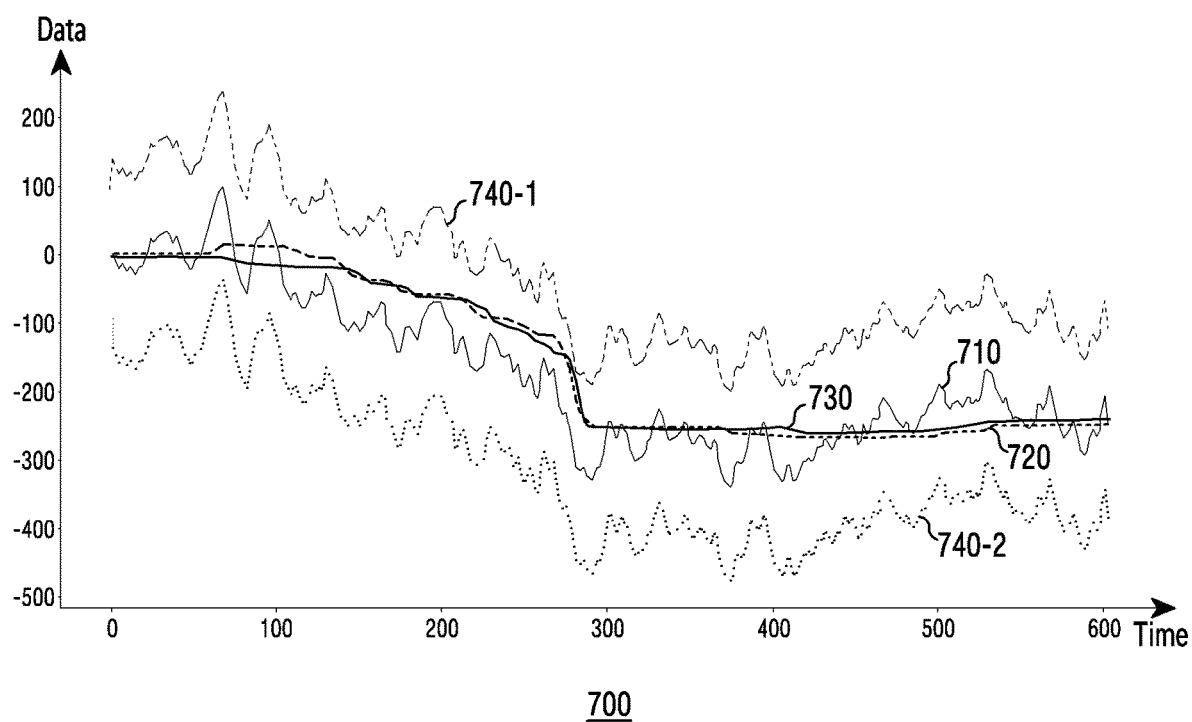
FIG. 7 is a graph for illustrating relationships between positions after camera correction determined through a hand shake correction algorithm and positions after camera correction determined through an artificial neural network, according to various embodiments.

FIG. 7 is a graph 700 for illustrating relationships between post-correction camera positions determined through a hand shake correction algorithm and post-correction camera positions determined through an artificial neural network, according to various embodiments.

Referring to FIG. 7, in an embodiment, a line 710 may indicate pre-correction camera positions, and lines 740-1 and 740-2 may indicate correctable positions of the pre-correction camera positions. In an embodiment, a line 720 may indicate post-correction camera positions determined through the hand shake correction algorithm. In an embodiment, a line 730 may indicate post-correction camera positions determined through the artificial neural network.

In an embodiment, as shown in FIG. 7, the line 720 indicating the post-correction camera positions determined through the hand shake correction algorithm may quite approximate the line 730 indicating the post-correction camera positions determined through the artificial neural network. The approximation of the line 720 and the line 730 may indicate that performance difference between the method for correcting the image frames through the artificial neural network and the method for correcting image the frames through the hand shake correction algorithm is quite small.

In an embodiment, the method for correcting the image frames through the hand shake correction algorithm may use about 15 through 30 image frames to correct the pre-correction camera position corresponding to the first image frame. In an embodiment, the method for correcting the image frames through the artificial neural network may use about 3 through 6 image frames to determine the post-correction camera position corresponding to the first image frame. In an embodiment, the method for correcting the image frames through the artificial neural network, which uses lesser image frames to determine the post-correction camera position corresponding to the first image frame, than the method for correcting the image frames through the hand shake correction algorithm, may reduce usage of the memory 340 (e.g., the buffer 341) for temporarily storing the used image frames. In an embodiment, the method for correcting the image frames through the artificial neural network, which calculates the post-correction camera positions corresponding to the image frames through the computation between the input data and the weight, may improve a processing rate (or shorten a processing time) for processing the image frames, compared to the method for correcting the image frames through the hand shake correction algorithm with considerable computations. For example, correcting the image frames through the hand shake correction algorithm takes about 10 msec to correct one image frame, whereas correcting the image frames through the artificial neural network may take about 0.3 msec to correct one image frame. In an embodiment, the method for correcting the image frames through the artificial neural network, which has less computation and high processing rate, may reduce current consumption, increase battery lifetime, and reduce heat generating at the electronic device 101, compared to the method for correcting the image frames through the hand shake correction algorithm.

An electronic device 101 according to various embodiments of the present invention, may include a camera 310, a motion sensor 320, a memory 340, and at least one processor 350, wherein the at least one processor 350 may be configured to, by using the camera 310, acquire a first image frame, a plurality of second image frames successive to the first image frame, and a third image frame immediately before the first image frame, while the camera 310 acquires the third image frame, the first image frame, and the plurality of the second image frames, detect a movement of the electronic device 101 using the motion sensor 320, determine a first position of the camera corresponding to the first image frame and a plurality of second positions of the camera corresponding to the plurality of the second image frames respectively, based at least in part on the movement of the electronic device 101, the first image frame, the plurality of the second image frames, and the third image frame, correct the first position, by conducting computations using a weight 343 learned through an artificial neural network, the first position, the plurality of the second positions, and a post-correction position of a third position of the camera corresponding to the third image frame, and correct the first image frame, based at least in part on the corrected first position.

In various embodiments, the at least one processor 350 may be configure to correct the first position, by performing computations using the weight 343, the first position, the plurality of the second positions, the post-correction position of the third position, and a difference between the post-correction position of the third position and a correctable position of the third position.

In various embodiments, the at least one processor 350 may be configure to correct the first position, by performing computations using the weight 343, the first position, the plurality of the second positions, the post-correction position of the third position, the difference between the post-correction position of the third position and the correctable position of the third position, and an average of positions of the camera corresponding to a plurality of image frames before the third image frame.

In various embodiments, the weight may be learned, based at least in part on camera positions corresponding to a designated first number of image frames, and positions of the positions corrected using a hand shake correction algorithm.

In various embodiments, if the number of the first image frame through the plurality of the second image frames is a designated second number, the designated second number may be less than the designated first number.

In various embodiments, the memory 340 may include a buffer 341 for temporarily storing the second number of the first image frame through the plurality of the second image frames and the third image frame.

In various embodiments, the motion sensor 320 may include at least one of a gyro sensor or an acceleration sensor.

In various embodiments, the at least one processor 350 may be configured to determine an area to crop in the first image frame, based at least in part on the corrected first position.

In various embodiments, the at least one processor 350 may be configured to correct the first position within a correctable position from the first position.

In various embodiments, the at least one processor 350 may be configured to, after correcting the first position, perform an operation for correcting a next image frame of the first image frame among the plurality of the second frames.

Figure 8:
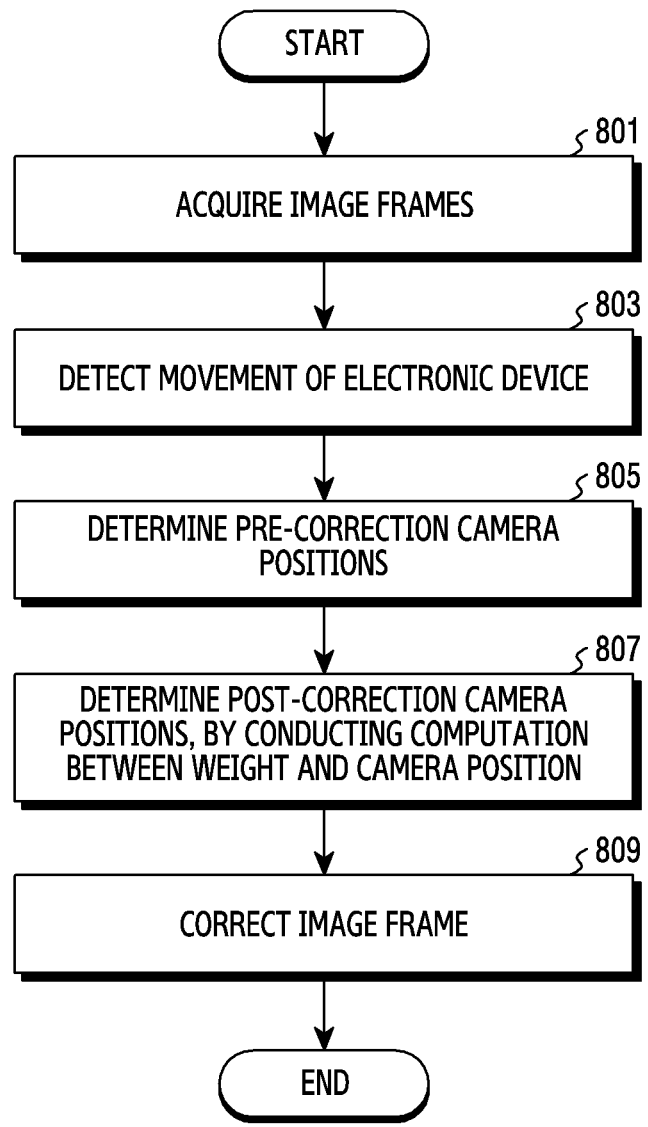
FIG. 8 is a flowchart illustrating a method for processing an image using an artificial neural network, according to various embodiments.

FIG. 8 is a flowchart illustrating a method for processing an image using an artificial neural network, according to various embodiments.

Referring to FIG. 8, in operation 801, in an embodiment, the processor 350 may acquire an image frame using the camera 310.

In an embodiment, the processor 350 may acquire a plurality of images successively acquired with respect to a subject, from the camera 310. In an embodiment, the plurality of the images (or original images) successively acquired through the camera 310 may be temporarily stored in the buffer 341 (e.g., the memory 250 of FIG. 2) to conduct the hand shake correction function. For example, to determine the post-correction camera position corresponding to the first image frame, the first image frame, the plurality of the second image frames, and the third image frame may be temporarily stored in the buffer 341. However, information stored in the buffer 341 is not limited thereto.

In operation 803, in an embodiment, the processor 350 may detect movement of the electronic device 101 while acquiring the image frames. For example, the processor 350 may detect the movement of the electronic device 101 by using the motion sensor 320, while acquiring the third image frame, the first image frame, and the plurality of the second image frames using the camera.

In an embodiment, the motion sensor 320 may include a gyro sensor (or a gyroscope) for detecting the movement of the electronic device 101. However, it is not limited thereto, and in an embodiment, the motion sensor 320 may include an acceleration sensor for detecting the movement of the electronic device 101. In an embodiment, the processor 350 may receive information of the detected motion of the electronic device 101, from the motion sensor 320.

In operation 805, in an embodiment, the processor 350 may determine pre-correction camera positions corresponding to the image frames.

In an embodiment, based at least in part on the movement of the electronic device 101 and the information of the third image frame, the first image frame, and the plurality of the second image frames, the processor 350 may determine pre-correction camera positions (or displacements, or coordinates) corresponding to the third image frame, the first image frame, and the plurality of the second image frames.

In an embodiment, the processor 350 may correct an error of an image change (or a pixel difference) between the third image frame and the first image frame based on the movement (or movement degree) of the electronic device 101 detected through the motion sensor 320 while the camera 310 acquires the third image frame and the first image frame. By removing noise of the movement of the electronic device 101 based on the image change between the third image frame and the first image frame with the error corrected, the processor 350 may determine the pre-correction camera position corresponding to the first image frame. The pre-correction camera positions corresponding to the plurality of the second image frames respectively may be determined in the same manner as the method for determining the pre-correction camera position corresponding to the first image frame. The pre-correction camera position corresponding to the third image frame may be determined through the operation of correcting the third image frame conducted before correcting the first image frame and then stored in the memory 340.

In operation 807, in an embodiment, the processor 350 may determine post-correction camera positions corresponding to the image frames, by conducting computation between the weight 343 learned through the artificial neural network and the camera positions.

In an embodiment, by performing computations using the weight 343 learned through the artificial neural network, the pre-correction camera position corresponding to the first image frame (or the pre-correction camera position corresponding to the first image frame and the correctable position of the pre-correction camera position corresponding to the first image frame), the pre-correction camera positions corresponding to the plurality of the second image frames (or the pre-correction camera positions corresponding to the plurality of the second image frames and the correctable positions of the pre-correction camera positions corresponding to the plurality of the second image frames), and the post-correction camera position corresponding to the third image, the processor 350 may determine (or calculate) the post-correction camera position corresponding to the first image frame (or the difference between the post-correction position corresponding to the third image frame and the post-correction camera position corresponding to the first image frame).

In an embodiment, the processor 350 may determine the post-correction camera position corresponding to the first image frame, by performing computations using the weight 343 learned through the artificial neural network, the pre-correction camera position corresponding to the first image frame, the pre-correction camera positions corresponding to the plurality of the second image frames respectively, the post-correction camera position corresponding to the third image frame, and the difference between the post-correction camera position corresponding to the third image frame and the correctable position (or range) of the post-correction camera position corresponding to the third image frame.

In an embodiment, the processor 350 may determine the post-correction camera position corresponding to the first image frame, by performing computations using the weight 343 learned through the artificial neural network, the pre-correction camera position corresponding to the first image frame, the pre-correction camera positions corresponding to the plurality of the second image frames respectively, the post-correction camera position corresponding to the third image frame, and the average of the post-correction camera positions corresponding to the designated number of the image frames before the third image frame (or acquired before acquiring the third image frame).

In an embodiment, the processor 350 may determine the post-correction camera position corresponding to the first image frame, by performing computations using the weight 343 learned through the artificial neural network, the pre-correction camera position corresponding to the first image frame, the pre-correction camera positions corresponding to the plurality of the second image frames respectively, the post-correction camera position corresponding to the third image frame, the difference between the post-correction camera position corresponding to the third image frame and the correctable position of the pre-correction camera position corresponding to the third image frame, and an average of camera positions corresponding to a designated number of image frames before the third image frame.

In an embodiment, the weight 343 may be learned at the electronic device 101 or other electronic device 101 (e.g., the electronic devices 101, 102, and 104, or the server 108). In an embodiment, if the weight 343 is learned at other electronic device (e.g., the electronic devices 102 and 104, or the server 108), the electronic device 101 may receive the weight from the other electronic device (e.g., the electronic devices 102 and 104, or the server 108) through the communication module 190.

In operation 809, in an embodiment, the processor 350 may correct the first image frame, based at least in part on the post-correction camera position corresponding to the first image frame.

In an embodiment, the processor 350 may determine an image area (or portion) to be stored or outputted from the first image frame, based at least in part on the post-correction camera position corresponding to the first image frame. For example, the processor 350 may determine the image area to be stored or outputted from the first image frame, based at least in part on the pre-correction camera position corresponding to the first image frame and the post-correction camera position corresponding to the first image frame.

Although not depicted in FIG. 8, after determining the image area to be stored or outputted from the first image frame (or after correcting the first image frame), the processor 350 may perform an operation of correcting a next image frame (or an image frame immediately acquired after acquiring the first image frame) of the first image frame. Since the operation of correcting the next image frame of the first image frame is the same at least in part as the operation of correcting the first image frame, its detailed descriptions will be omitted.

In an embodiment, if the image area to be stored or outputted is determined, the processor 350 may crop the image area to be stored or outputted from the first image frame. In an embodiment, the processor 350 may store the cropped image area in the memory 340. In an embodiment, the processor 350 may output the cropped image area using the display 330.

Figure 9:
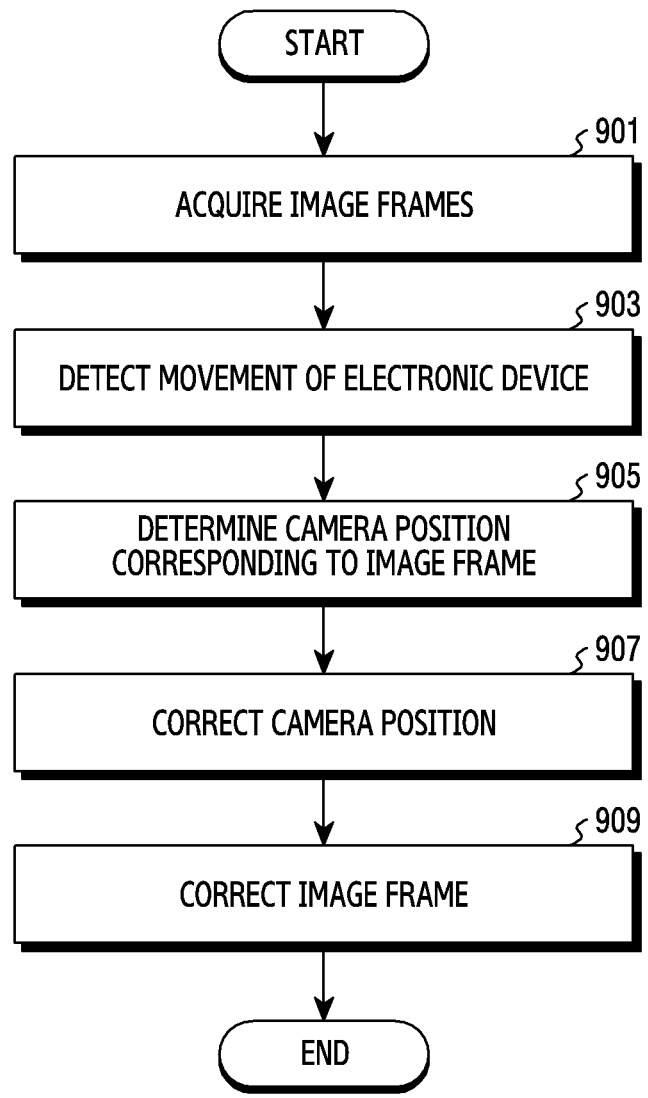
FIG. 9 is a flowchart illustrating a method of determining a camera position corresponding to an image frame using a hand shake correction algorithm, according to various embodiments.

FIG. 9 is a flowchart illustrating a method of determining a camera position corresponding to an image frame using a hand shake correction algorithm, according to various embodiments.

In an embodiment, the method of determining the camera position corresponding to the image frame using the hand shake correction algorithm of FIG. 9 may be performed to calculate necessary information to learn the weight through the artificial neural network.

Referring to FIG. 9, in operation 901, the processor 350 may acquire an image frame using the camera 310.

In an embodiment, the processor 350 may acquire a plurality of images successively acquired with respect to a subject, from the camera 310. In an embodiment, the plurality of the images (or original images) successively acquired through the camera 310 may be temporarily stored in the buffer 341 (e.g., the memory 250 of FIG. 2) to conduct the hand shake correction function. For example, to determine the post-correction camera position corresponding to the first image frame, the first image frame, the plurality of the second image frames, and the third image frame may be temporarily stored in the buffer 341. However, information stored in the buffer 341 is not limited thereto.

In an embodiment, the number of the image frames (e.g., about 15 through 30) used to correct the pre-correction camera position corresponding to the first image frame using the hand shake correction algorithm may be greater about 3 times through 5 times than the number of the image frames (e.g., about 3 through 6) used to correct the pre-correction camera position corresponding to the first image frame using the weight of FIG. 8.

In operation 903, in an embodiment, the processor 350 may detect movement of the electronic device 101 while acquiring the image frames. For example, the processor 350 may detect the movement of the electronic device 101 by using the motion sensor 320, while acquiring the third image frame, the first image frame, and the plurality of the second image frames using the camera.

Since operation 903 is identical or similar at least in part to operation 803 of FIG. 8, its detailed description will be omitted.

In operation 905, in an embodiment, the processor 350 may determine pre-correction camera positions corresponding to the image frames.

Since operation 905 is identical or similar at least in part to operation 805 of FIG. 8, its detailed description will be omitted.

In operation 905, in an embodiment, the processor 350 may determine a post-correction camera position corresponding to the first image frame using the hand shake correction algorithm.

In an embodiment, the processor 350 may identify the pre-correction camera positions corresponding to the first image frame through the plurality of the second image frames and the post-correction camera position corresponding to the third image frame.

In an embodiment, the processor 350 may determine virtual post-correction camera positions which satisfy a designated condition.

In an embodiment, the processor 350 may determine the virtual post-correction camera positions corresponding to the first image frame through the plurality of the second image frames respectively within the correctable positions, and satisfying a condition which minimizes a sum value of changes (or absolute values of changes) between virtual post-correction camera positions corresponding to the last image frame of the virtual post-correction camera position corresponding to the third image frame through the plurality of the image frames, a sum value of speed changes of the virtual post-correction camera positions, a sum value of acceleration changes of the virtual post-correction camera positions, or at least two sum values considering the weight of the change of the virtual post-correction camera positions, the speed change, or the acceleration change.

In an embodiment, the processor 350 may exclude the condition that the virtual post-correction camera positions corresponding to the first image frame through the plurality of the second image frames respectively are within the correctable positions, and determine the virtual post-correction camera positions based on the condition which minimizes the sum value of changes (or the absolute values of changes) between the virtual post-correction camera positions corresponding to the last image frame of the virtual post-correction camera position corresponding to the third image frame through the plurality of the image frames, the sum value of the speed changes of the virtual post-correction camera positions, the sum value of the acceleration changes of the virtual post-correction camera positions, or at least two sum values considering the weight of the change of the virtual post-correction camera positions, the speed change, or the acceleration change.

In an embodiment, the processor 350 may determine the virtual correction camera position corresponding to the first image frame among the virtual post-correction camera positions satisfying the designated condition, to the post-correction camera position corresponding to the first image frame.

In the above examples, based on the pre-correction camera positions corresponding to the first image frame through the plurality of the second image frames and the post-correction camera position corresponding to the third image frame, the method for determining the post-correction camera position corresponding to the first image frame is illustrated, but is not limited thereto. For example, the electronic device 101 may determine the post-correction camera position corresponding to the first image frame, by further considering the difference between the post-correction camera position corresponding to the third image frame and the correctable position of the pre-correction camera position corresponding to the third image frame, together with the pre-correction camera positions corresponding to the first image frame through the plurality of the second image frames and the post-correction camera position corresponding to the third image frame.

While operation 907 illustrates the method of determining the post-correction camera position corresponding to the first image frame, it may be applied to a method of determining post-correction camera positions corresponding to next image frames of the first image frame in the same or similar manner.

The hand shake correction algorithm described in operation 907 is exemplary, and is not limited thereto. For example, as the hand shake correction algorithm, the kalman filter, the particle filter, or the low path filter may be used.

In operation 909, in an embodiment, the processor 350 may correct the first image frame, based at least in part on the post-correction camera position corresponding to the first image frame.

Since operation 909 is identical or similar at least in part to operation 809 of FIG. 8, its detailed description will be omitted.

FIG. 9 illustrates that operations are conducted at the electronic device 101, but are not limited thereto. For example, operations of FIG. 9 may be performed by other electronic devices (e.g., the electronic devices 102 and 104).

Figure 10:
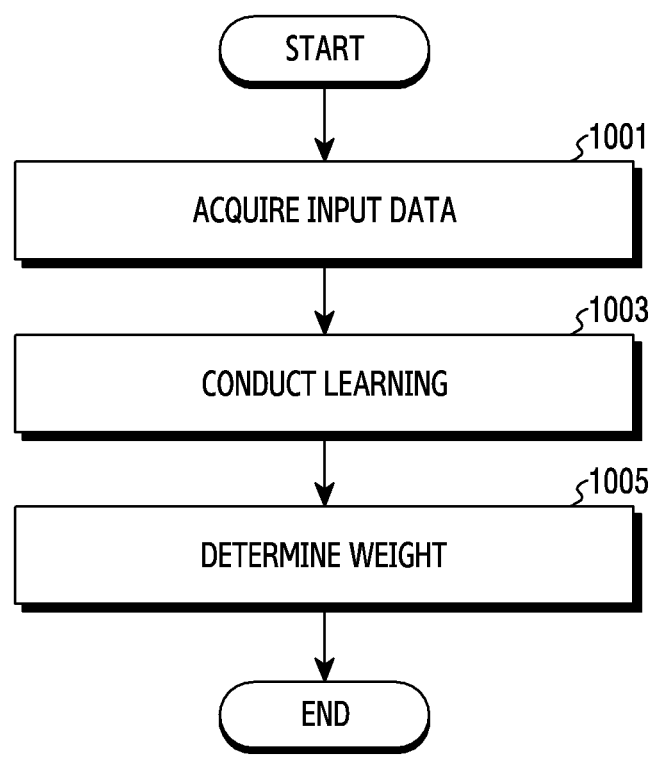
FIG. 10 is a flowchart illustrating a method of determining a weight through an artificial neural network, according to various embodiments.

FIG. 10 is a flowchart illustrating a method of determining a weight 343 through an artificial neural network, according to various embodiments.

Referring to FIG. 10, in operation 1001, in an embodiment, the processor 350 may acquire input data for the learning.

In an embodiment, the processor 350 may acquire, as the input data for the learning, the pre-correction camera position corresponding to the first image frame determined through the operations of FIG. 9 (or the pre-correction camera position corresponding to the first image frame or the correctable position of the pre-correction camera position corresponding to the first image frame), the pre-correction camera positions corresponding to the plurality of the second image frames (or the pre-correction camera positions corresponding to the plurality of the second image frames and the correctable positions of the pre-correction camera positions corresponding to the plurality of the second image frames), and the post-correction camera position corresponding to the third image frame. However, the input data for the learning is not limited to the above-described examples.

For example, the input data may include the pre-correction camera position corresponding to the first image frame, the pre-correction camera positions corresponding to the plurality of the second image frames, the post-correction camera position corresponding to the third image frame, and the difference between the post-correction camera position corresponding to the third image frame and the correctable position (or range) of the pre-correction camera position corresponding to the third image frame. As another example, the input data may include the pre-correction camera position corresponding to the first image frame, the pre-correction camera positions corresponding to the plurality of the second image frames, the post-correction camera position corresponding to the third image frame, and an average of post-correction camera positions corresponding to a designated number of image frames before the third image frame (or acquired before acquiring the third image frame).

In operation 1003, the processor 350 may perform the learning using the input data and weights.

In an embodiment, the post-correction camera positions determined through the hand shake correction algorithm of FIG. 9 may be used for error correction of the weight (or the post-correction camera positions determined through the hand shake correction algorithm may be used as the ground truth). For example, if the post-correction camera position corresponding to the first image frame (or the difference between the post-correction camera position corresponding to the third image frame and the post-correction of the camera corresponding to the first image frame) is determined (or generated) through computation between the input data and the weight, the weight may be learned (or updated, or retraining) (e.g., learn using error back propagation) based on an error between the post-correction camera position corresponding to the first image frame through the computation between the determined input data and the weight and the post-correction camera position corresponding to the first image frame determined through the hand shake correction algorithm.

In an embodiment, the number of the pre-correction camera positions corresponding to the first image frame through the second image frames (e.g., about 15 through 30) for the learning through the artificial neural network, may be less than the number of the pre-correction camera positions (e.g., about 3 through 6) corresponding to the first image frame through the second image frames used in the hand shake correction algorithm of FIG. 9.

In operation 1005, in an embodiment, the processor 350 may determine a weight. For example, the processor 350 may determine the weight learned (or updated) in operation 1003 as the weight.

In an embodiment, the artificial neural network may include CNN, RNN, or deep belief networks, and restricted boltzman machines. However, it is not limited thereto, and artificial neural networks of various types may be used.

In an embodiment, operations of FIG. 10 may be performed at the electronic device 101 or other electronic device (e.g., the server 108, the electronic devices 102 and 104). In an embodiment, if operations of FIG. 10 are performed at other electronic device (e.g., the server 108, the electronic devices 102 and 104), the weight determined through operations of FIG. 10 may be transmitted to the electronic device 101.

A method according to various embodiments of the present invention may include, by using a camera 310 of an electronic device 101, acquiring a first image frame, a plurality of second image frames successive to the first image frame, and a third image frame immediately before the first image frame, while the camera 310 acquires the third image frame, the first image frame, and the plurality of the second image frames, detecting a movement of the electronic device 101 using a motion sensor 320 of the electronic device 101, determining a first position of the camera corresponding to the first image frame and a plurality of second positions of the camera corresponding to the plurality of the second image frames respectively, based at least in part on the movement of the electronic device 101, the first image frame, the plurality of the second image frames, and the third image frame, correcting the first position, by conducting computations using a weight 343 learned through an artificial neural network, the first position, the plurality of the second positions, and a post-correction position of a third position of the camera corresponding to the third image frame, and correcting the first image frame, based at least in part on the corrected first position.

In various embodiments, correcting the first position may include correcting the first position, by performing computations using the weight 343, the first position, the plurality of the second positions, the post-correction position of the third position, and a difference between the post-correction position of the third position and a correctable position of the third position.

In various embodiments, correcting the first position may include correcting the first position, by performing computations using the weight 343, the first position, the plurality of the second positions, the post-correction position of the third position, the difference between the post-correction position of the third position and the correctable position of the third position, and an average of positions of the camera corresponding to a plurality of image frames before the third image frame.

In various embodiments, the weight may be learned, based at least in part on camera positions corresponding to a designated first number of image frames, and positions of the positions corrected using a hand shake correction algorithm.

In various embodiments, if the number of the first image frame through the plurality of the second image frames is a designated second number, the designated second number may be less than the designated first number.

In various embodiments, the memory 340 of the electronic device 101 may include a buffer 341 for temporarily storing the second number of the first image frame through the plurality of the second image frames and the third image frame.

In various embodiments, the motion sensor 320 may include at least one of a gyro sensor or an acceleration sensor.

In various embodiments, correcting the first image frame may include determining an area to crop in the first image frame, based at least in part on the corrected first position.

In addition, a data structure used in the embodiments of the present invention may be recorded in a computer readable recording medium through various means. The computer readable recording medium includes a storage medium such as a magnetic storage medium (e.g., a read only memory (ROM), a floppy disk, a hard disk, etc.), or an optical recording medium (e.g., a compact disk (CD)-ROM, or a digital versatile disk (DVD)).

In an embodiment, the computer readable recording medium may record a program for executing, at an electronic device 101, by using a camera 310 of an electronic device 101, acquiring a first image frame, a plurality of second image frames successive to the first image frame, and a third image frame immediately before the first image frame, while the camera 310 acquires the third image frame, the first image frame, and the plurality of the second image frames, detecting a movement of the electronic device 101 using a motion sensor 320 of the electronic device 101, determining a first position of the camera corresponding to the first image frame and a plurality of second positions of the camera corresponding to the plurality of the second image frames respectively, based at least in part on the movement of the electronic device 101, the first image frame, the plurality of the second image frames, and the third image frame, correcting the first position, by conducting computations using a weight 343 learned through an artificial neural network, the first position, the plurality of the second positions, and a post-correction position of a third position of the camera corresponding to the third image frame, and correcting the first image frame, based at least in part on the corrected first position.

So far, preferred embodiments of the present invention have been described. One skilled in the art of the technical field which the present invention belongs to will understand that the present invention may be implemented in a modified form without departing from the essential characteristics of the present invention. Therefore, the disclosed embodiments should be considered in a descriptive sense and not for purposes of limitation. The scope of the present invention is disclosed in the claims, not in the above-stated descriptions, and all differences within the equivalent scope should be construed as being included in the present invention.

The invention claimed is:

1. An electronic device comprising:
a camera;
a motion sensor;
a memory; and
at least one processor,
wherein the at least one processor is configured to,
using the camera, acquire a first image frame, a plurality of second image frames successive to the first image frame, and a third image frame immediately before the first image frame,
while the camera acquires the third image frame, the first image frame, and the plurality of the second image frames, detect a movement of the electronic device using the motion sensor,
determine a first position of the camera corresponding to the first image frame and a plurality of second positions of the camera corresponding to the plurality of the second image frames respectively, based at least in part on the movement of the electronic device, the first image frame, the plurality of the second image frames, and the third image frame,
correct the first position, by conducting computations using a weight learned through an artificial neural network, the first position, the plurality of the second positions, a post-correction position of a third position of the camera corresponding to the third image frame, and a difference between the post-correction position of the third position and a correctable position of the third position, and
correct the first image frame, based at least in part on the corrected first position.

2. The electronic device of claim 1, wherein the at least one processor is configured to,
correct the first position, by performing computations using the weight, the first position, the plurality of the second positions, the post-correction position of the third position, the difference between the post-correction position of the third position and the correctable position of the third position, and an average of positions of the camera corresponding to a plurality of image frames before the third image frame.

3. The electronic device of claim 1, wherein the weight is learned, based at least in part on camera positions corresponding to a designated first number of image frames, and positions of the positions corrected using a hand shake correction algorithm.

4. The electronic device of claim 1, wherein the motion sensor comprises at least one of a gyro sensor or an acceleration sensor.

5. The electronic device of claim 1, wherein the at least one processor is configured to,
determine an area to crop in the first image frame, based at least in part on the corrected first position.

6. The electronic device of claim 1, wherein the at least one processor is configured to,
correct the first position within a correctable position from the first position.

7. The electronic device of claim 1, wherein the at least one processor is configured to,
after correcting the first position, perform an operation for correcting a next image frame of the first image frame among the plurality of the second frames.

8. A method comprising:
by using a camera of an electronic device, acquiring a first image frame, a plurality of second image frames successive to the first image frame, and a third image frame immediately before the first image frame;
while the camera acquires the third image frame, the first image frame, and the plurality of the second image frames, detecting a movement of the electronic device using a motion sensor of the electronic device;
determining a first position of the camera corresponding to the first image frame and a plurality of second positions of the camera corresponding to the plurality of the second image frames respectively, based at least in part on the movement of the electronic device, the first image frame, the plurality of the second image frames, and the third image frame;
correcting the first position, by conducting computations using a weight learned through an artificial neural network, the first position, the plurality of the second positions, a post-correction position of a third position of the camera corresponding to the third image frame and a difference between the post-correction position of the third position and a correctable position of the third position; and
correcting the first image frame, based at least in part on the corrected first position.

9. The method of claim 8, wherein correcting the first position comprises:
correcting the first position, by performing computations using the weight, the first position, the plurality of the second positions, the post-correction position of the third position, the difference between the post-correction position of the third position and the correctable position of the third position, and an average of positions of the camera corresponding to a plurality of image frames before the third image frame.

10. The method of claim 8, wherein the weight is learned, based at least in part on camera positions corresponding to a designated first number of image frames, and positions of the positions corrected using a hand shake correction algorithm.

11. The method of claim 8, wherein the motion sensor comprises at least one of a gyro sensor or an acceleration sensor.

12. The method of claim 8, wherein correcting the first image frame comprises:
   determining an area to crop in the first image frame, based at least in part on the corrected first position.

13. The method of claim 8, wherein correcting the first position comprises:
   correcting the first position within a correctable position from the first position.

* * * * *